(12) United States Patent
Cox et al.

(10) Patent No.: US 11,879,370 B2
(45) Date of Patent: Jan. 23, 2024

(54) INTEGRATED POWER CONVERTER TO SUPPORT POWER OUTPUTS AT DIFFERENT POTENTIAL FOR VEHICLES WITH A HEATED CATALYST

(71) Applicant: Ford Global Technologies, LLC, Dearborn, MI (US)

(72) Inventors: David Cox, London (GB); Anthemios Philemon Petridis, Herts (GB); David Hesketh, Essex (GB)

(73) Assignee: Ford Global Technologies, LLC, Dearborn, MI (US)

( * ) Notice: Subject to any disclaimer, the term of this patent is extended or adjusted under 35 U.S.C. 154(b) by 439 days.

(21) Appl. No.: 17/122,840

(22) Filed: Dec. 15, 2020

(65) Prior Publication Data
US 2022/0186646 A1   Jun. 16, 2022

(51) Int. Cl.
*F01N 3/20* (2006.01)
*B60W 20/16* (2016.01)

(52) U.S. Cl.
CPC ........... *F01N 3/2013* (2013.01); *B60W 20/16* (2016.01); *F01N 2240/16* (2013.01); *F01N 2610/105* (2013.01)

(58) Field of Classification Search
CPC ........ F01N 3/2013; F01N 9/00; F01N 3/2026; F01N 3/2006; F01N 2900/104; F01N 2900/0602; F01N 2390/02; B60L 2210/10; B60L 1/02; F02D 41/024; B60H 1/00385; H02P 9/307
See application file for complete search history.

(56) References Cited

U.S. PATENT DOCUMENTS

| | | | | |
|---|---|---|---|---|
| 5,319,929 A * | 6/1994 | Cornelison | .......... | B01J 35/0033 422/174 |
| 5,345,761 A * | 9/1994 | King | ......... | B60L 1/12 60/284 |
| 6,018,694 A | 1/2000 | Egami et al. | | |
| 6,362,535 B1 | 3/2002 | Tilyou et al. | | |
| 10,738,672 B2 * | 8/2020 | Harmsen | .................. | F01N 5/04 |
| 11,199,118 B2 * | 12/2021 | Dudar | ................... | F01N 11/005 |
| 2008/0223019 A1 * | 9/2008 | Gonze | ................... | F01N 3/2066 60/286 |
| 2010/0242446 A1 * | 9/2010 | Granqvist | ............. | F01N 3/2013 60/300 |
| 2012/0247084 A1 * | 10/2012 | Atluri | ....................... | F01N 9/00 60/274 |
| 2012/0255279 A1 * | 10/2012 | Atluri | .................... | F01N 3/027 60/299 |
| 2014/0174059 A1 | 6/2014 | Katsuta | | |

(Continued)

FOREIGN PATENT DOCUMENTS

JP          2017040208 A *   2/2017

*Primary Examiner* — Anthony Ayala Delgado
(74) *Attorney, Agent, or Firm* — David B. Kelley; Brooks Kushman P.C.

(57) ABSTRACT

A vehicle includes a power converter that receives power, and has first and second outputs, a low voltage battery that receives power from the power converter via the first output, and a heating element that receives power from the power converter via the second output, and provides heat to a catalyst of an exhaust system. The vehicle also includes a controller that commands the converter to provide power to the heating element via the second output according to a temperature of the catalyst.

17 Claims, 2 Drawing Sheets

(56) References Cited

U.S. PATENT DOCUMENTS

| | | | |
|---|---|---|---|
| 2016/0212885 A1* | 7/2016 | Ikeda | B60L 1/003 |
| 2018/0258874 A1* | 9/2018 | Okamoto | F01P 3/20 |
| 2019/0063288 A1* | 2/2019 | Romanato | F01N 3/2013 |
| 2019/0234272 A1* | 8/2019 | Harmsen | F02M 26/04 |

* cited by examiner

INTEGRATED POWER CONVERTER TO SUPPORT POWER OUTPUTS AT DIFFERENT POTENTIAL FOR VEHICLES WITH A HEATED CATALYST

TECHNICAL FIELD

The present disclosure relates to vehicle exhaust systems.

BACKGROUND

Most vehicles that employ a carbon emission propulsion system reduce emissions via a catalytic converter. Increasing the temperature of a catalytic converter may increase the efficiency of the device. Many vehicles use an electric heater to increase the temperature of the catalytic converter. Vehicle batteries, including traction batteries, are susceptible to lose energy capacity over time. Some patterns of electrical parameters the battery is exposed to may cause degradation faster than other patterns. One pattern that causes premature degradation is constant switching, exposing the battery to a large total energy throughput. Decreasing the throughput will prolong the life of the battery.

SUMMARY

A vehicle includes a power converter that receives power, and has first and second outputs, a low voltage battery that receives power from the power converter via the first output, and a heating element that receives power from the power converter via the second output, and provides heat to a catalyst of an exhaust system. The vehicle also includes a controller that commands the converter to provide power to the heating element via the second output according to a temperature of the catalyst such that a value of the power provided to the heating element via the second output increases as the temperature decreases.

A method for controlling a vehicle power system includes commanding a power converter to provide power to a low voltage battery via a first output and to provide power to a heating element of an exhaust system that includes a catalyst via a second output according to a temperature of the catalyst.

An automotive power system includes a high-voltage electrical bus network and a coolant pump. The high-voltage electrical bus network receives electrical energy from a generator. The generator is in mechanical communication with an internal combustion engine. The high-voltage electrical bus network further electrically communicates with both a low-voltage electrical bus network and a secondary electrical bus network via a converter. The converter has at least an input and a plurality of outputs. The secondary electrical bus network provides electrical energy to a catalytic thermal regulator via one of the plurality of outputs from the converter. The coolant pump receives electrical energy from the low-voltage electrical bus network to pump coolant between the pump and a high-voltage battery. The coolant pump further pumps coolant to the converter and the generator. The high-voltage battery is in electrical communication with the high-voltage electrical bus network.

DETAILED DESCRIPTION

Figure 1:
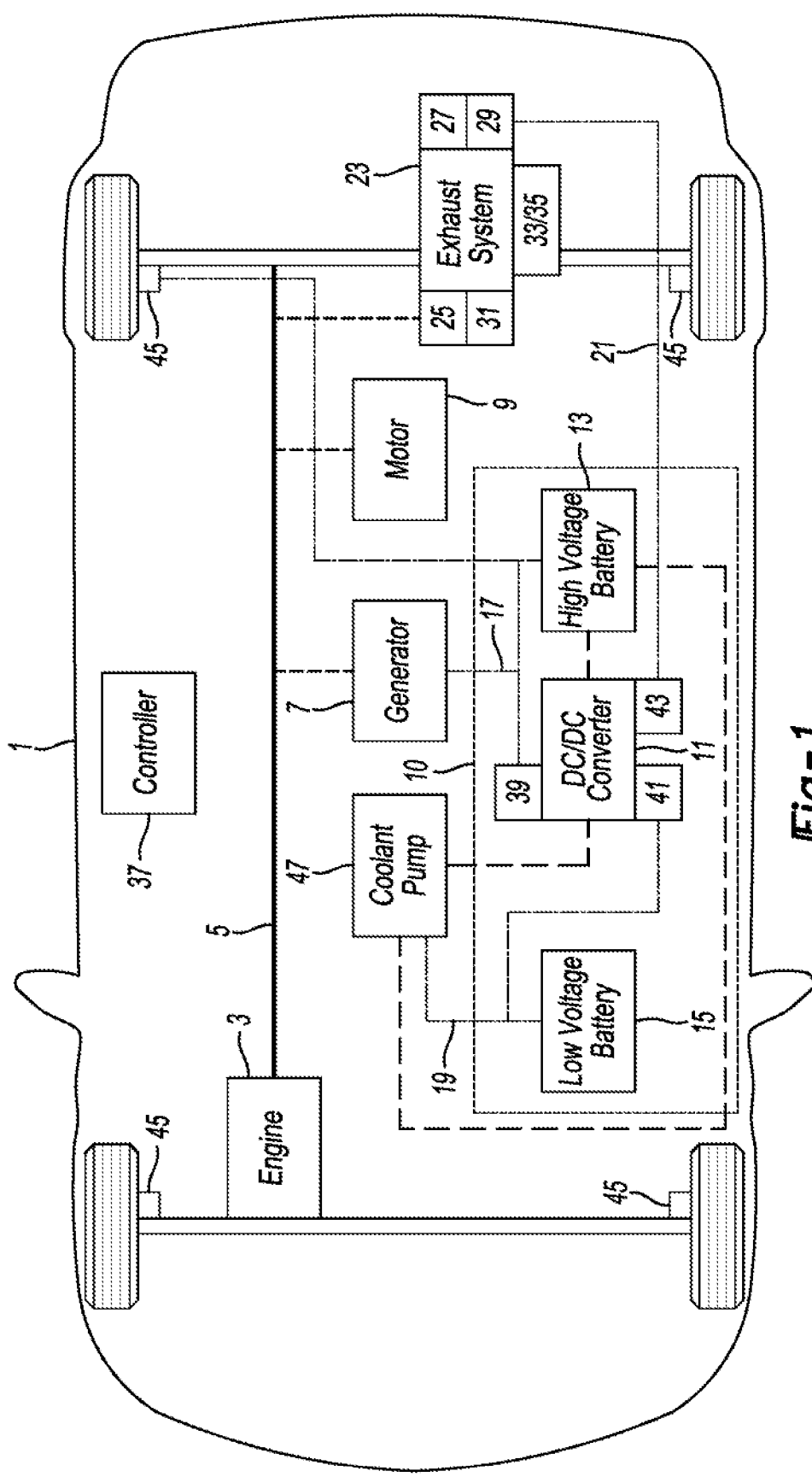
FIG. 1 illustrates a vehicle.

As required, detailed embodiments are disclosed herein. It is to be understood, however, that the disclosed embodiments are merely exemplary-various and alternative forms are also contemplated. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

To meet certain emissions requirements both gasoline and diesel internal combustion engine powertrains require catalyst heating (eCAT) to assist catalyst light off. An objective may be to use a high voltage hybrid electric vehicle (HEV) system to supply power to the eCAT on HEV applications. The eCAT is essentially a resistor which has low inductance. Its power demand is modulated by low frequency switching via pulse width modulation (PWM). This cycles the high voltage hybrid battery aggressively and has the potential to age the battery aggressively, potentially impacting its life. A solution is required to smooth the power out from the high voltage HEV powernet to the eCAT with a method to vary the power. This additional control of eCAT power variance potentially drives a requirement for a new component within the system, subsequently increasing overall system cost.

A solution may be to integrate a secondary output within the existing high voltage hybrid powernet to low voltage DC/DC converter, which is already part of the hybrid system, to support the low voltage powernet from the high voltage powernet. Therefore, the DC/DC converter would have two outputs, the existing low voltage output and an additional high voltage output to supply electrical power to the eCAT. The combined DC/DC converter would be devised to enable the power to the eCAT to be varied. There is potential for the internals of the existing DC/DC to be shared to support two outputs, including the liquid cooling system, wiring, and controller for example. This may also improve cost and potentially improve package space challenges.

Using the DC/DC converter to support the eCAT power demand is part of the solution, rather than switching the eCAT via low frequency PWM, which may aggressively age the battery through battery cycling.

Generally speaking, a vehicle may use an electric power source for propulsion. For example, the vehicle may include a high voltage battery used for propulsion of the vehicle. Additionally, the vehicle may be partially propelled by an internal combustion power source such as an internal combustion engine. In embodiments containing both electrical and internal combustion power sources, the internal combustion power source may be in electrical communication with the electrical power source, such that power generated by the internal combustion power source may be used to charge the electrical power source. In such embodiments, the internal combustion power source may use electrical power components to facilitate conversion of combustion power to electrical power. For example, the internal combustion power source may be in mechanical communication with a generator. The generator may be in electrical communication with the electrical power source. In this configuration, the internal combustion power source may use combustion to operate the generator, thus charging the electrical power source. The vehicle may comprise other electrical power components.

The vehicle may comprise a drivetrain. The drivetrain may be in at least one of electrical, magnetic, and mechanical communication with at least one of an internal combustion engine, an electric power source, and a regenerative braking system. In some embodiments, the drivetrain may be in fluid communication with the internal combustion engine. For example, the vehicle may have a torque converter between the drivetrain and the internal combustion engine. Alternatively, the vehicle may have a clutch between the drivetrain and the internal combustion engine.

The drivetrain may comprise a regenerative braking system. The regenerative braking system may be in mechanical communication with vehicle wheels. The regenerative braking system may be in electrical communication with one of the primary electrical power source, the secondary electrical power source, and the converter such that the regenerative braking system is configured to produce electricity from inertia gathered from the mechanical communication with the vehicle wheels. Electricity gathered from the regenerative braking system may be converted by the converter such that its electrical parameters are suited for either of the high-voltage and low-voltage electrical bus networks. Alternatively, the regenerative braking system may be configured to produce electricity having electrical parameters suited for either of the high-voltage and low-voltage electrical bus networks.

The vehicle may have a plurality of energy storage power sources. For example, the vehicle may include a high voltage battery configured to provide one of electrical current, voltage, and power for vehicle propulsion in which the one of the current, voltage, and power value is a first predetermined value. In addition to the high voltage battery, the vehicle may include a supplementary battery configured to provide one of electrical current, voltage, and power to a vehicle, wherein the one of the current, voltage, and power value is a second predetermined value distinct from the first predetermined value. Energy from the supplementary battery may be used for vehicle needs outside of propulsion. Alternatively, the supplementary battery may be used as a backup, or in addition to the high voltage battery for propulsion.

The vehicle may have a vehicle power network. The vehicle power network may include a plurality of electrical bus networks. For example, the power network may include a high-voltage bus network, a low-voltage bus network, and a secondary network. In such embodiments, the vehicle power network may include a high-voltage battery in direct electrical communication with the high-voltage bus network. Similarly, the power network may include a low-voltage battery in direct electrical communication with the low-voltage bus network.

The power network may further comprise a converter between the high-voltage and low-voltage bus networks. The converter may allow and regulate electrical communication between the high-voltage and low-voltage bus networks. The converter may be a DC/DC converter. As such, the converter may decrease the electrical potential parameter of electricity traversing from the high-voltage bus network to the low-voltage bus network. Further, the converter may increase the electrical potential parameter of electricity traversing from the low-voltage bus network to the high-voltage bus network. The converter may allow and regulate electrical communication between the high-voltage and secondary bus networks. In some embodiments, the converter may regulate the electrical potential parameter of electricity traversing from the high-voltage bus network to the secondary bus network. For example, the converter may ensure that the electrical potential of the secondary bus network is substantially the same as the high-voltage bus network. In some embodiments, the converter may have an input and a plurality of outputs. For example the converter may be in direct electrical communication with the high-voltage bus network via the input, while being in direct electrical communication with the low-voltage bus network via a first output, and in direct electrical communication with the secondary bus network via a second output. In some embodiments, the first output may also serve as an input. The converter may comprise a capacitor in parallel to one of the outputs. The capacitor may act to decrease a power differential. Decreasing the volatility in power differential may act to mitigate battery degradation. The converter may be configured such that while providing power to the secondary bus network, the second output is not exposed to electrical current of a predetermined threshold. For example, the converter may be configured such that the electrical current between the input and the second output does not reach 0 during power transmission.

The converter may be configured to selectively allow and inhibit electrical communication between the plurality of electrical networks. In alternate embodiments, the power network may comprise alternate converters that may change other electrical parameters of electricity traversing between the bus networks. Still in other embodiments, the power network may comprise a plurality of converters for the regulation of electrical communication between the electrical bus networks. Even further, the converter may allow a plurality of electrical communication values. For example, the converter may be configured to allow a plurality of electrical current values. In some embodiments, the plurality may be comprised of discrete values. In alternate embodiments, the converter may be comprised of a range of analog values. The converter may be configured to receive electrical energy from one of the generator, a high-voltage battery, a regenerative braking system, a stationary charger, or other energy sources, and transfer the electrical energy to at least one of the low-voltage bus networks and the secondary bus network. The converter may further be configured to allow one-way travel of electrical current between a pair of electrical bus networks and dual travel between a pair of other electrical bus networks. For example, the converter may be configured to allow electrical current to how back and forth between the high-voltage bus network and the low-voltage network, while only allowing electrical current to flow from the high-voltage bus network to the secondary bus network. As such, the converter may allow electrical energy to flow from the low-voltage bus network to the high-voltage bus network and then to the secondary bus network. The converter may be configured to provide linear power from the high-voltage bus network to the secondary bus network. For example, 48 V on the secondary bus may require 4 kW of power from the high-voltage bus network, and 24 V of potential may require 1 kW of power.

The vehicle may have an exhaust gas system. The exhaust gas system may be used to manage gas generated from the internal combustion engine. The exhaust gas system may have a catalytic converter, a thermal regulator, and an exhaust gas regulator. The catalytic converter may be used to convert a first gas generated by the engine into a second gas. The catalytic converter may operate more efficiently at a predetermined temperature value. The predetermined temperature may be greater than the resting or atmospheric temperature. As such, the catalytic converter may benefit from thermal stimulation. The catalytic converter may be in thermal communication with an electric heater. The electric heater may be used to increase the temperature of the catalytic converter such that the catalytic converter is hotter than its resting temperature. The electric heater may be in electrical communication with the secondary bus network. The electric heater may be configured to convert electrical energy received from the secondary bus network into thermal energy. Thus, the electric heater may use electrical energy from the secondary bus network to heat the catalytic converter. The catalytic converter may be in thermal communication with a temperature sensor. The temperature sensor may be configured to determine the temperature of the catalytic converter. The exhaust gas system may comprise a fluid sensor. Additionally or alternatively, the exhaust gas system may comprise a plurality of fluid sensors. The fluid sensor may be configured to determine at least one of the speed, mass, flux, density, temperature, and flow of exhaust gas disposed in the exhaust system. The fluid sensor may further be configured to determine the quality of the exhaust after treatment of the exhaust fluid. Alternatively, a plurality of fluid sensors may be employed to determine these fluid attributes.

The vehicle may comprise an exhaust gas regulator. The exhaust gas regulator may be used to recycle inertial energy from exhaust gas. For example, the vehicle may comprise a turbo-conductor, wherein the exhaust gas is used to compress atmosphere and is forced into the intake of the internal combustion engine. Similar to the catalytic converter, the exhaust gas regulator may be better suited to operate at temperatures greater than resting temperature. As such, the exhaust gas regulator may be in thermal communication with the electric heater. Additionally, the exhaust gas regulator may further comprise a temperature sensor. The temperature sensor may be configured to determine the temperature of the exhaust gas regulator. Alternatively, the temperature sensor may be configured to determine the temperature of the fluid throughout the exhaust gas regulator.

The vehicle may have a cooling system. The cooling system may be configured to provide thermal regulation to the primary power source. For example, the cooling system may have a cooling plate in thermal communication with a high-voltage battery, wherein the cooling system is selectively operated to reduce the high-voltage battery temperature in response to the high-voltage battery reaching a predetermined temperature threshold. Alternatively, the cooling system may be configured to provide thermal regulation to an additional electrical power source and/or an alternate electrical power source. Similarly, the cooling system may be configured to provide thermal regulation to an additional or alternate converter. The cooling system may comprise a coolant pump. The coolant pump may facilitate thermal regulation of hybrid components by distributing coolant throughout the system. For example, the coolant pump may aid in coolant traveling between the generator, the high-voltage battery, and the converter. The coolant pump may use electrical energy from the low-voltage bus network to aid in the distribution of coolant. The coolant pump may increase energy efficiency of the vehicle by maintaining the temperatures of the hybrid components including the integrated DCDC converter to an optimal temperature.

The vehicle may comprise a controller. The controller may be in communication with and be configured to regulate the converter. The controller may selectively allow electricity of varying parameters to traverse between the input and outputs of the converter. In some embodiments, the controller may regulate the electrical power between the input and one of the outputs by varying the electrical current. For example, the controller may command the converter to remain at 48 V on both the high-voltage bus network and the secondary bus network, but allow the current to reach 83 A. Alternatively, the controller may be configured to vary the voltage provided to the secondary bus network. Varying the voltage may change the output of the electric heater. The electric heater may be formulaically affected by varying one of the electrical potential, electrical current, and electrical power supply. For example, the electric heater output temperature may be linearly affected by an increase in electrical potential, wherein the electric heater increases the temperature of the catalytic converter by 100° C. when supplied with 24 V, and the electric heater increases the temperature of the catalytic converter by 200° C. when supplied with 48 V.

The controller may be in communication with at least one fluid sensor. The controller may be provided fluid information determined by the fluid sensor. The controller may be configured to determine an expected temperature of the catalyst based in part on fluid information. The controller may hold in memory a desired temperature of the catalyst. The desired temperature of the catalyst may be updated in the memory based in part on the performance of the exhaust system. The performance may be monitored by a fluid sensor. For example, if the fluid sensor determines that the temperature of NOx is least at 200° C., the controller may update the memory to store the value. The controller may be configured to calculate a desired heater increase. The desired heater increase value may be the difference between the current or expected temperature value of the catalyst and the desired temperature. The controller may consider one of the current temperature of the catalyst, the expected temperature of the catalyst, and the fluid information in determining the desired catalyst temperature increase. The controller may be configured to adjust an electrical parameter of the electric heater according to a temperature schedule. The temperature schedule may contain entries based on electrical parameters of the heater as well as historical performance of the electric heater when exposed to various electrical parameters. Additionally or alternatively, the temperature schedule may contain entries based on the performance data of the catalyst in response to various temperatures of the electric heater. The controller may be configured to calculate a maintenance temperature of the electric heater used to maintain a temperature of the catalyst. The maintenance temperature may be based in part on the historical performance data of one of the electric heater and the catalyst.

FIG. 1 illustrates a hybrid vehicle 1. The hybrid vehicle 1 comprises an engine 3, a drivetrain 5, a generator 7, and a motor 9. The engine 3 is in mechanical communication with a drivetrain 5. The engine 3 is in mechanical communication with the generator 7 and the motor 9 via the drivetrain 5. In some embodiments the generator 7 is in direct mechanical communication with the engine 3. The drivetrain 5 is provided mechanical energy from the engine 3, which it converts to electrical energy. The drivetrain 5 then provides a power network 10 with the electrical energy. The power network 10 may receive electrical energy from a regenerative braking system 45 in electrical communication with the power network 10. The power network 10 comprises a DC/DC converter 11, high voltage battery 13, low voltage battery 15, high-voltage electrical bus network 17, low-voltage electrical bus network 19, and secondary electrical bus network 21. The DC/TC converter 11 is in direct electrical communication with the high-voltage electrical bus network 17, low-voltage electrical bus network 19, and secondary electrical bus network 21. The high voltage battery 13 is in direct communication with the high-voltage electrical bus network 17 via an input 39. The low voltage battery 15 is in direct communication with the low-voltage electrical bus network 19 via a first output 41. Additionally, an electric heater 29 is in direct electrical communication with the secondary electrical bus network 21 via a second output 43.

The engine 3 is further in fluid communication with an exhaust system 23. The exhaust system 23 comprises an exhaust gas regulator 25, catalytic converter 27, and electric heater 29. The exhaust gas regulator 25 may be used to provide forced induction of air into the engine 3. The catalytic converter 27 may be used to convert exhaust gases into a different composition. The catalytic converter 27 is in thermal communication with the electric heater 29. The electric heater 29 is configured to convert electrical energy from the secondary electrical bus network 21 into thermal energy to increase the temperature of the catalytic converter 27. The exhaust system 23 further comprises a fluid sensor 31 which determines and monitors one of the speed, mass, flux, density, temperature, and flow of exhaust gas disposed in the exhaust system 23. The catalytic converter 27 is in thermal communication with a catalyst temperature sensor 33. The electric heater 29 is in thermal communication with an electric heater temperature sensor 35. A coolant pump 47 is in thermal communication with the high voltage battery 13, DC/DC converter 11, and generator 7. The coolant pump 47 is in electrical communication with the low-voltage bus network 19. The hybrid vehicle 1 comprises a controller 37. The controller 37 is in communication with and may selectively operate the electric heater 29 and the DC/DC converter 11. The controller 37 is also in communication with the fluid sensor 31, catalyst temperature sensor 33, and the electric heater temperature sensor 35.

Figure 2:
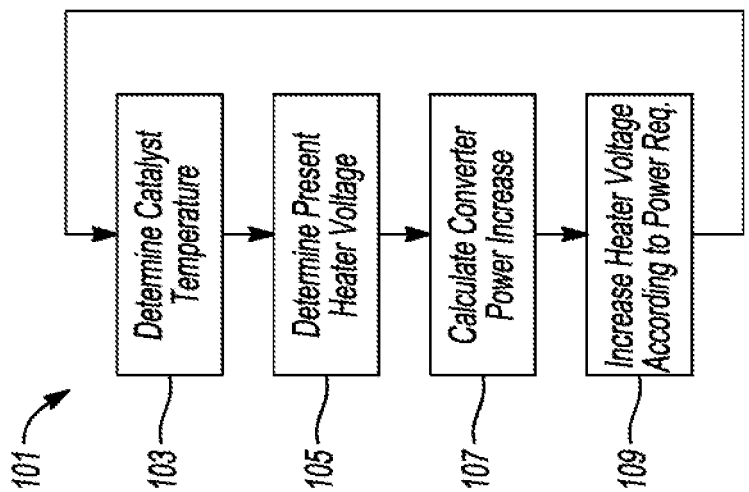
FIG. 2 illustrates a first heating execution algorithm.

FIG. 2 illustrates a first heating execution algorithm 101. The first heating execution algorithm 101 begins with a determine catalyst temperature step 103, in which the controller 37 receives the temperature of the catalytic converter 27 via the catalyst temperature sensor 33. Next, the first heating execution algorithm 101 moves to a determine present heater voltage step 105, in which the controller 37 receives the temperature of the electric heater 29 via the electric heater temperature sensor 35. The first heating execution algorithm 101 then moves to a calculate power increase step 107, in which the controller calculates the power needed to increase the catalyst temperature to the desired value. If the temperature is above the desired value, the controller 37 may choose to remove all power from the electric heater 29. Next, the increase heater voltage step 109 increases the power to the electric heater 29 according to the calculate power increase step 107. The power may be increased by increasing the electric potential. Further the increase heater voltage step 109 may decrease the power from the electric heater 29. Last, the first heating execution algorithm 101 moves back to the determine catalyst temperature step 103 to complete the loop.

Figure 3:
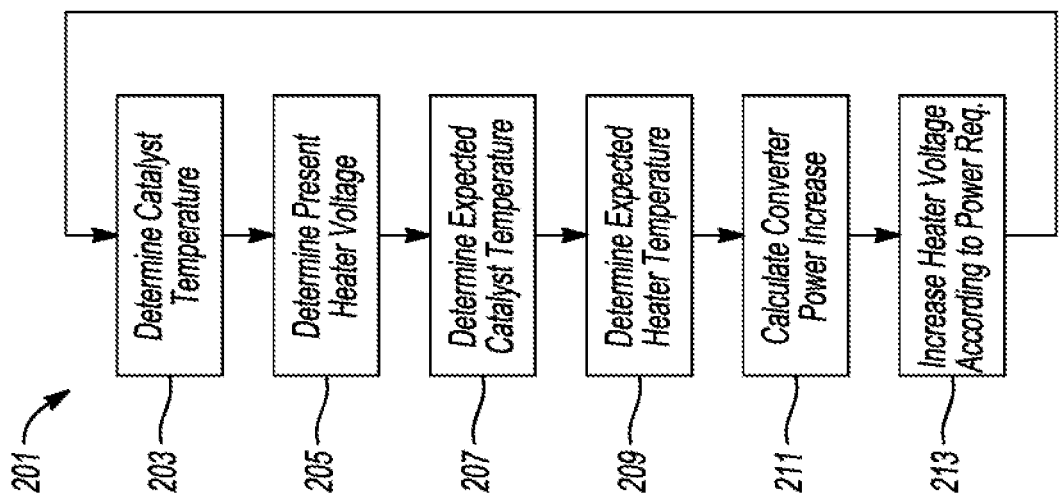
FIG. 3 illustrates a second heating execution method algorithm.

FIG. 3 illustrates a second heating execution algorithm 201. The second heating execution algorithm 201 begins with a determine catalyst temperature step 203, in which the controller 37 receives the temperature of the catalytic converter 27 via the catalyst temperature sensor 33. Next, the second heating execution algorithm 201 moves to a determine present heater voltage step 205, in which the controller 37 receives the temperature of the electric heater 29 via the electric heater temperature sensor 35. The second heating execution algorithm 201 then moves to a determine expected catalyst temperature step 207, in which the controller determines an expected catalyst temperature change due in part to the parameters of the fluid flowing through the exhaust system 23. Next, the second heating execution algorithm 201 moves to a determine expected heater temperature step 209 in which the controller determines an expected temperature of the heater. The prediction is due in part to historical performance data of the heater. The prediction may be an additional catalyst prediction algorithm (see FIG. 4). In some embodiments, the determine expected catalyst temperature step 207 and determine expected heater temperature step 209 are part of a thermal model. The second heating execution algorithm 201 then moves to a calculate power increase step 211, in which the controller calculates the power needed to increase the catalyst temperature to the desired value. If the temperature is above the desired value, the controller 37 may choose to remove all power from the electric heater 29. Next, the increase heater voltage step 213 increases the power to the electric heater 29 according to the calculate power increase step 211. The power may be increased by increasing the electric potential. Further the increase heater voltage step 213 may decrease the power from the electric heater 29. Last, the second heating execution algorithm 201 moves back to the determine catalyst temperature step 203 to complete the loop.

Figure 4:
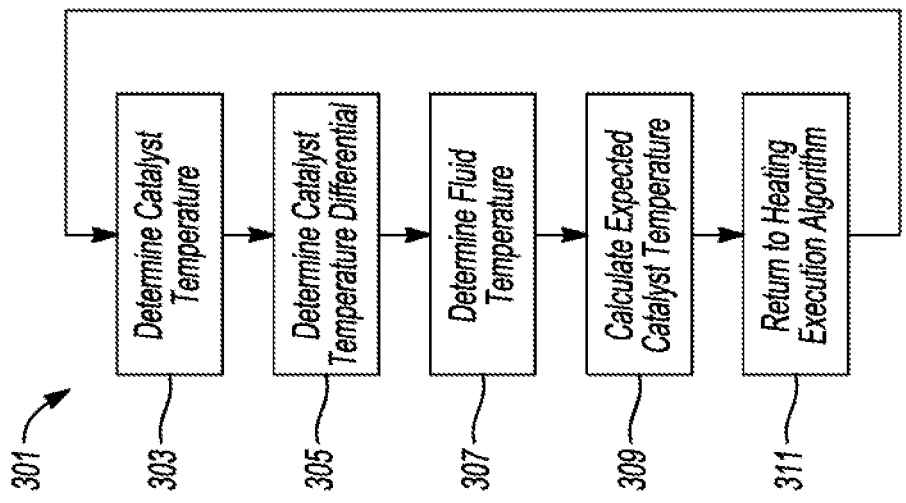
FIG. 4 illustrates a third heating execution method algorithm.

FIG. 4 illustrates a catalyst prediction algorithm 301. As mentioned earlier, the determine expected catalyst temperature step 207 and determine expected heater temperature step 209 may be part of a thermal model. The catalyst prediction algorithm 301 begins with a determine catalyst temperature step 303 to gather the temperature of the catalytic converter 27. Next the determine catalyst temperature differential step 305 looks at historical data as well as fluid data to determine an expected catalyst temperature without influence of additional power to the electric heater 29. The catalyst prediction algorithm 301 then moves to a determine temperature of fluid step 307 to gather the current temperature of fluid within the exhaust system 23. With the data of the determine catalyst temperature step 303, determine catalyst temperature differential step 305, and determine temperature of fluid step 307, the calculate expected catalyst temperature step 309 calculates the expected temperature of the catalytic converter 27 without additional power.

As suggested above, controllers, interfaces, modules, etc. described herein may communicate via one or more vehicle networks. The vehicle network may include a plurality of channels for communication. One channel of the vehicle network may be a serial bus such as a CAN. One of the channels of the vehicle network may include an Ethernet network defined by the Institute of Electrical and Electronics Engineers 802 family of standards. Additional channels of the vehicle network may include discrete connections between modules and may include power signals from a low voltage battery. Different signals may be transferred over different channels of the vehicle network. For example, video signals may be transferred over a high-speed channel (e.g., Ethernet) while control signals may be transferred over CAN or discrete signals. The vehicle network may include any hardware and software components, wired or wireless, that aid in transferring signals and data between modules. The vehicle network may connect to any electronic module that is present or remote from the vehicle via a transceiver or the like.

The processes, methods, or algorithms disclosed herein can be deliverable to or implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a power converter having first and second outputs and configured to receive power at an input different than the first and second outputs;
   a low voltage battery configured to receive power from the power converter via the first output;
   a heating element configured to receive power from the power converter via the second output, and to provide heat to a catalyst of an exhaust system; and
   a controller programmed to command the converter to provide power to the heating element via the second output according to a temperature of the catalyst such that a value of the power provided to the heating element via the second output increases as the temperature decreases.

2. The vehicle of claim 1, wherein the power provided to the low voltage battery via the first output is at a potential of up to approximately 12 V, and wherein the power provided to the heating element via the second output is at a potential nominal voltage that is greater than approximately 12 V.

3. The vehicle of claim 1 further comprising a high voltage battery configured to receive power from the generator.

4. The vehicle of claim 3, wherein the high voltage battery is a battery with a potential nominal voltage that is greater than 12 V.

5. The vehicle of claim 1 further comprising a high voltage battery configured to receiver power from the generator, and a pump configured to receive electrical power from the low-voltage bus network and to drive coolant to the high voltage battery.

6. The vehicle of claim 5, wherein the pump is further configured to drive the coolant to the power converter.

7. The vehicle of claim 1 further comprising an engine mechanically coupled with the generator.

8. The vehicle of claim 1, wherein the power converter is a DC/DC power converter.

9. A method for controlling a vehicle power system, comprising:
   while receiving power at an input of a power converter having first and second outputs different than the input, commanding the power converter to, at a same time, provide power to a low voltage battery via the first output and provide power to a heating element of an exhaust system that includes a catalyst via the second output according to a temperature of the catalyst.

10. The method of claim 9, wherein a value of the power provided to the heating element via the second output increases as the temperature decreases.

11. The method of claim 9, wherein the power provided to the low voltage battery via the first output is at a potential up to 12 V, and wherein the power provided to the heating element via the second output is at a nominal voltage that is greater than approximately 12 V.

12. An automotive power system comprising:
   a high voltage electrical bus network configured to receive electrical energy from a generator in mechanical communication with an internal combustion engine, wherein the high voltage electrical bus network is in electrical communication with both a low voltage electrical bus network configured to charge a low voltage battery via a first output of a converter, and a secondary electrical bus network configured to, at a same time as the charge, provide electrical energy to a catalytic thermal regulator via a second output of the converter, wherein the converter is configured to receive power at an input different than the first and second outputs;
   a pump configured to receive electrical energy from one of the low voltage electrical bus network and high voltage electrical bus network, to pump coolant between the pump and a high voltage battery in electrical communication with the high voltage electrical bus network; and
   a controller programmed to,
      in response to a catalyst temperature being within a first predetermined range, command the converter to provide a first electrical parameter to the secondary bus, and
      in response to the catalyst temperature being within a second predetermined range, command the converter to provide a second electrical parameter to the secondary bus.

13. The automotive power system of claim 12 further comprising an exhaust gas regulator in fluid communication with the thermal regulator and the internal combustion engine.

14. The automotive power system of claim 13, wherein a median of the first predetermined range is less than a median of the second predetermined range, and wherein a value of the first electrical parameter is greater than a value of the second electrical parameter.

15. The automotive power system of claim 14, wherein the converter is configured to regulate an electrical potential value between the high voltage electrical bus network and the secondary electrical bus network.

16. The automotive power system of claim 13, wherein the pump is further configured to pump coolant through to the converter.

17. The automotive power system of claim 12, wherein the converter is a DC/DC converter.

\* \* \* \* \*